United States Patent [19]
Sakaguchi

[11] Patent Number: 4,951,898
[45] Date of Patent: Aug. 28, 1990

[54] DOUBLE BEARING REEL

[75] Inventor: Noboru Sakaguchi, Tondabayashi, Japan

[73] Assignee: Shimano Industrial Company Limited, Osaka, Japan

[21] Appl. No.: 358,414

[22] Filed: May 30, 1989

[30] Foreign Application Priority Data

Jun. 8, 1988 [JP] Japan .................................. 63-76205

[51] Int. Cl.⁵ ............................................ A01K 89/015
[52] U.S. Cl. .................................... 242/255; 242/260
[58] Field of Search ............... 242/255, 267, 268, 264; 74/371, 372, 323

[56] References Cited

U.S. PATENT DOCUMENTS

| | | | |
|---|---|---|---|
| 2,006,481 | 7/1935 | Russell | 242/268 X |
| 2,150,088 | 3/1939 | White | 242/255 X |
| 2,240,075 | 4/1941 | Kovalovsky | 242/255 |
| 3,104,850 | 9/1963 | Wood | 242/267 X |
| 3,325,117 | 6/1967 | Hiromitsu | 242/255 |
| 3,499,609 | 3/1970 | Policansky | 242/255 X |
| 4,850,549 | 7/1989 | Sakumoto | 242/255 |

FOREIGN PATENT DOCUMENTS

| | | | |
|---|---|---|---|
| 1144422 | 10/1957 | France | 242/255 |
| 60-13359 | 4/1985 | Japan . | |
| 60-207539 | 10/1985 | Japan . | |

Primary Examiner—Katherine A. Matecki
Attorney, Agent, or Firm—Dickstein, Shapiro & Morin

[57] ABSTRACT

A double bearing reel is provided which includes first and second main gears which have different diameters and are rotatably supported around a handle shaft. A sleeve is rotatably supported on the handle shaft. The sleeve includes a shifter for selectively transmitting rotation of the handle shaft to one of the first and second main gears, so that the shifter is operated to transmit rotation of the handle shaft to a spool to enable changing the rotation speed of the spool.

6 Claims, 4 Drawing Sheets

DOUBLE BEARING REEL

FIELD OF THE INVENTION

The present invention relates to a double bearing fishing reel, and more particularly, to a double bearing reel having a driving mechanism for changing the rotation speed of a spool.

BACKGROUND OF THE INVENTION

Generally, a double bearing reel, as disclosed in Japanese Utility Model Publication Gazette No. Sho 60-13359, is constructed such that a spool shaft for a spool and a handle shaft are rotatably supported to a reel body, and around the handle shaft are supported a main gear, a stationary side braking member and a rotational side braking member for applying a braking force against rotation of the spool. I addition, an adjuster is provided for adjusting the braking force, and a pinion, engageable with the main gear, is provided at the spool shaft so that a driving force from the handle shaft is transmitted to the spool through the braking members, main gear, pinion and spool shaft to thereby drive the spool. Also, when a fishing line drawn out from the spool is subjected to tension in the drawing direction, the tension acts on the rotational side braking member through the spool, spool shaft, pinion and main gear, so that a slip is generated between the rotational side braking member and the stationary side braking member, thereby slidably rotating the spool.

The above type of double bearing reel drives the spool at a predetermined speed change ratio determined by a gear ratio of the one main gear to the one pinion engageable therewith. In addition, a double bearing reel has been provided which uses two gears different in diameter from one another so that the spool can be changed with respect to its driving speed.

The latter type of double bearing reel, as disclosed in Japanese Patent Laid-Open Gazette No. Sho 60-207539, is constructed such that a pair of bearings are interposed between the spool and the spool shaft, and the spool is supported to the spool shaft rotatably and axially movably thereto through the bearings. The reel includes a plurality of speed change gears at one axial end of the spool shaft and around the handle shaft. The handle shaft is axially movable and is axially moved to changeover the speed change gear between a low speed drive and a high speed drive. Also, around the other axial end of the spool shaft are provided the stationary side braking member and the rotational side braking member for applying a braking force against rotation of the spool, so that a driving force from the handle shaft is transmitted to the spool through the speed change gear, spool shaft and braking members. In addition, tension applied to a fishing line drawn out from the spool acts on the rotational side braking member through the spool, thereby causing a slip between the rotational braking member and the stationary braking member.

The latter type of reel which is adapted to change the driving speed for the spool is quite different in basic construction from the conventional first type of double bearing reel described above. In other words, the spool is rotatable and axially movable relative to the spool shaft, the handle shaft is axially movable, and a drive unit provided with a plurality of gears and a drag unit for applying the braking force against rotation of the spool are disposed separately at both axial ends of the spool shaft, thereby creating a problem in that the reel is very complicated in construction and has a very high manufacturing cost.

SUMMARY OF THE INVENTION

An object of the invention is to provide a double bearing reel which includes novel structure to enable changing the driving speed for the spool, with this novel structure being incorporated into the reel without changing the basic or fundamental construction of the overall reel from that of a conventional double bearing reel. The present invention is characterized in that a double bearing reel, which is provided with a reel body, a spool shaft having a spool rotatably supported to the reel body, and a handle shaft for driving the spool shaft, is provided with (1) first and second main gears different in diameter and rotatably supported around the handle shaft, (2) a sleeve rotatably supported on the handle shaft and having a shifter for selectively transmitting rotation thereof to the first or the second main gear, (3) a drag mechanism provided with handle shaft side braking members rotatable together with the handle shaft and sleeve side braking members rotatable together with the sleeve and disposed opposite to the handle shaft side braking members, (4) operating means for selecting the shifter for one of the first and second main gears and having an operating unit positioned at the exterior of the reel body, and (5) pinions supported to the spool shaft so as to transmit to the spool shaft a driving force transmitted thereto and comprising a first pinion engageable with the first main gear and a second pinion engageable with the second main gear.

Accordingly, in the present invention, the shifter provided at the sleeve is operated to select the first or the second main gear, thereby enabling the spool to be driven at a low or a high speed, and a simple and novel construction can be incorporated into the reel to enable changing the driving speed for the spool by utilizing the handle shaft, without fundamentally changing the usual double bearing reel construction.

According to the invention, the shifter is operated to transmit a driving force from the handle shaft to the spool through the braking members at the drag mechanism; sleeve; shifter; first main gear and first pinion, or the second main gear and second pinion; and spool shaft; thereby enabling the spool to be driven at a low or a high speed. Also, tension applied to the fishing line drawn out from the spool is transmitted to the sleeve side braking members through the spool shaft; first pinion and first main gear, or the second pinion and second main gear; shifter; and sleeve; so that a slip is caused between the sleeve side braking members and the handle shaft side braking members, thereby slidably rotating the spool.

The above and further objects and novel features of the invention will be more fully apparent from the following description when the same is read in connection with the accompanying drawings.

DETAILED DESCRIPTION OF THE PREFERRED EMBODIMENTS

Figure 1:
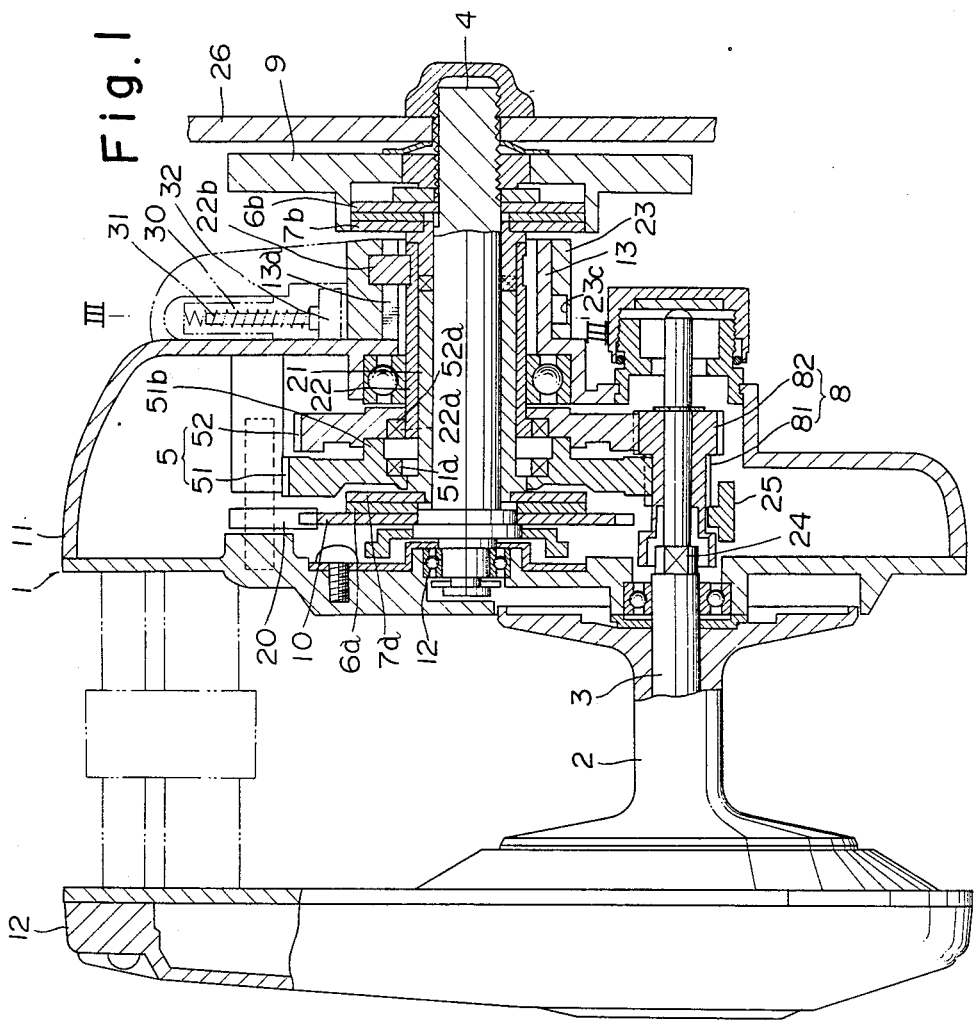
FIG. 1 is a partially cutaway view of an embodiment of a double bearing reel of the invention.

A double bearing reel of the invention is provided on a reel having a basic construction generally the same as that of a conventional reel. Referring to FIG. 1, a spool shaft 3 holding a spool 2 is rotatably supported between side frames 11 and 12 of a reel body 1. A handle shaft 4 is journalled to side frame 11. Handle shaft 4 is parallel to spool shaft 3. Main gears 5, to be discussed in detail below, handle shaft side braking members 6a and 6b and sleeve side braking members 7a and 7b for applying a driving force to rotation of spool 2, an adjustor 9 for adjusting the braking force, and an anti-reverse-rotation gear 10 are provided around handle shaft 4. A pinion 8 engageable with main gears 5 is provided at one axial end of spool shaft 3.

In the embodiment shown in FIGS. 1 through 4, a sleeve 21 is rotatably supported onto the outer periphery of handle shaft 4. A larger diameter first main gear 51 and a smaller diameter second main gear 52 are supported at the outer periphery of one axial end of sleeve 21. First and second main gears 51 and 52 are rotatable relative to each other, and at one axial end of spool shaft 3 are provided a smaller diameter first pinion 81 engageable with first main gear 51 and a larger diameter second pinion 82 engageable with second main gear 52. Also, at the outer periphery of sleeve 21 is axially movably supported a shifter 22 which selectively transmits rotation of handle shaft 4 to first main gear 51 or second main gear 52 and is operable from the exterior of reel body 1.

In the above construction, handle shaft 4 is supported at its root portion to side frame 11 through a bearing 12. At the outer periphery of the root portion of handle shaft 4 is rotatably supported an anti-reverse-rotation gear 10 engageable with an anti-reverse-rotation pawl 20 pivoted to side frame 11. Adjuster 9 screws with the outer periphery of the utmost end of handle shaft 4, and sleeve 21 is supported to the outer periphery of an intermediate portion of the same.

Sleeve 21 is provided at the outer peripheries of both its front and rear ends with larger diameter portions respectively. First main gear 51 is rotatably supported onto the outer periphery of the larger diameter portion at the front end of sleeve 21 and sleeve side braking member 7a is supported at an axially outside position of the larger diameter portion at the front end of sleeve 21 so as to be non-rotatable relative to sleeve 21. Sleeve side braking member 7a is positioned opposite to handle shaft side braking member 6a which is supported to the root of handle shaft 4 so as to be non-rotatable relative to shaft 4. Sleeve side braking member 7b is supported at an axially outside position of the larger diameter portion at the rear end of sleeve 21 so as to be nonrotatable relative to sleeve 21. Handle side braking member 6b is supported to the utmost end of handle shaft 4 so as to be non-rotatable relative thereto. Braking members 6b and 7b are positioned opposite to one another as shown.

Adjustor 9 screws forward to bring handle shaft side braking members 6a and 6b into press-contact with sleeve side braking members 7a and 7b disposed opposite thereto at the root and utmost end of handle shaft 4 respectively, thereby adjusting a dragging braking force. In other words, when spool 2 tends to be caused to rotate in reverse by tension applied to the fishing line, the reverse-rotation force is transmitted to sleeve 21 and is braked by anti-reverse-rotation gear 10 engaging with anti-reverse-rotation pawl 20 to restrain spool 2 from undergoing reverse rotation, handle shaft 4 held in the stationary state, and the braking members 6a, 6b, 7a and 7b. When the reverse-rotation force exceeds the dragging braking force established by adjustor 9, a slip is caused between the respective braking members, so that spool 2 rotates in reverse while being applied with a predetermined braking force.

Sleeve 21, which is provided with shifter 22 for selectively transmitting the driving force transmitted from handle shaft 4 to the first or second main gear 51 or 52, is formed of a pair of divided portions so that shifter 22 is assembled therebetween. Shifter 22 is supported to sleeve 21 so as to be axially movable between the larger diameter portions at both axial ends of sleeve 21 and is provided circumferentially at the outer periphery of one end with an engaging portion 22a engageable with engaging portions 51a and 52a at the inner peripheries of first and second main gears 51 and 52.

Figure 3:
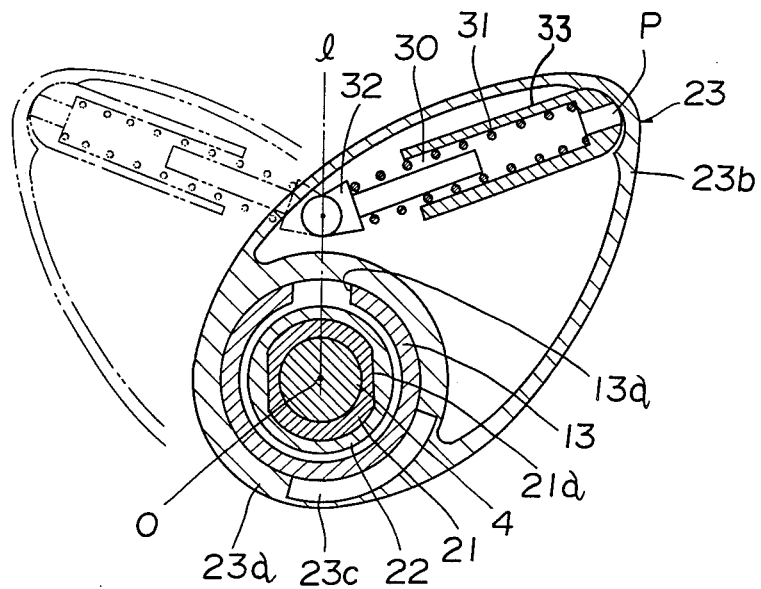
FIG. 3 is a sectional view taken on line III—III in FIG. 1.
Figure 4:
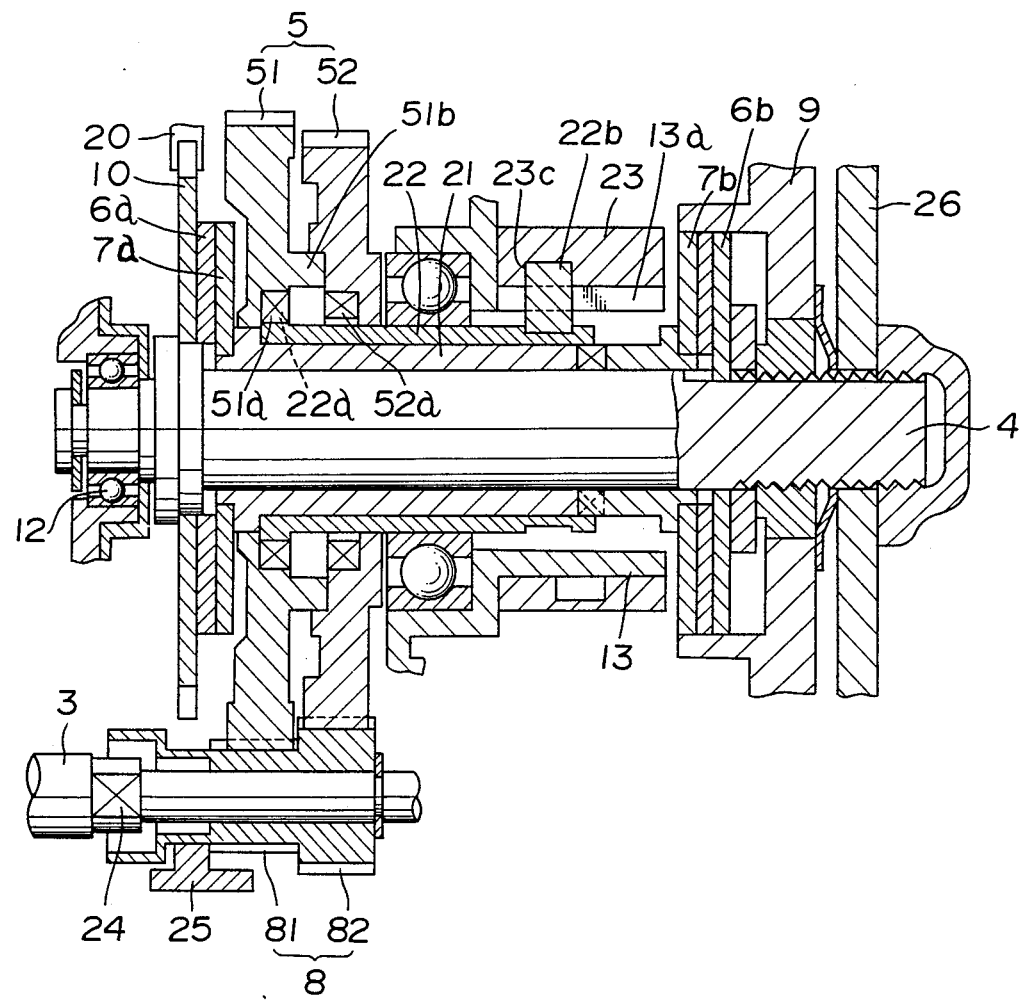
FIG. 4 is a sectional view illustrating operation of the reel of the invention, corresponding to FIG. 2.

In greater detail, shifter 22, as shown in FIG. 3, is cylindrical and has at its inner periphery a pair of flat faces engageable with flat faces 21a formed at the outer periphery of sleeve 21, thereby being supported non-rotatably and axially movably only relative to sleeve 21.

Also, the other end of shifter 22 projects outwardly from reel body 1, and an annular groove is provided at the outer periphery of this projecting end. An engaging projection 22b is relative-movably supported into the annular groove and is axially moved by operation of an operating member 23.

Operating member 23 comprises a boss 23a supported to be rotatable but not axially movable on a support cylinder 13 projecting outwardly from side frame 11 to be concentrically arranged with handle shaft 4 and an operating portion 23b projecting outwardly from one side of boss 23a. A spiral groove 23c engageable with engaging projection 22b is provided at the inner periphery of boss 23a, and a slit 13a for guiding engaging projection 22b is provided at support cylinder 13, so that operating member 23 is rotated to reciprocate shifter 22 axially.

Main gears 51 and 52 are circumferentially provided at their outer peripheries with a large number of teeth and at their inner peripheries with engaging portions 51a and 52a respectively. An annular projection 51b projects from one side surface of first main gear 51 rotatably supported to the larger diameter portion of sleeve 21 and second main gear 52 is relative-rotatably supported to annular projection 51b.

Pinions 81 and 82 are integral with each other and are rotatable and axially movable with respect to spool shaft 3. First pinion 81 extends outwardly at one end, and a clutch 24 is provided between the inner periphery of the extension of pinion 81 and the outer periphery of an intermediate portion of spool shaft 3. A clutch yoke 25 engages with the outer surface of the extension, and a clutch lever (not shown) slidably supported to side frame 11 is operated to axially move pinions 81 and 82 through clutch yoke 25, thereby engaging or disconnecting clutch 24.

An unstable change-over holding mechanism 30 for biasing and holding operating member 23 to the low speed operation position or the high speed operation position is provided between operating member 23 and side frame 11. Mechanism 30 comprises a coil spring 31 and first and second spring holders 32 and 33. First spring holder 32 is swingably pivoted at a position shifted from supporting center 0 of operating member 23 at side frame 11 and holds one end of coil spring 31. Second spring holder 33 is swingably supported to the inner periphery of operating portion 23b so as to hold the other end of coil spring 31. As a result of this structure, when operating member 23 rotates and supporting position P of spring 31 at operating portion 23b, that is, the support position of second spring holder 33, moves toward one side in the operating direction beyond the line 1 connecting the pivot position of the first spring holder 32 and the supporting position 0 for the operating member 23, operating member 23 is adapted to be biased to the low speed operation position, and, when position P moves toward the other side beyond line 1, the same is biased toward the high speed operation position. In addition, due to the above construction, when operating member 23 is operated, even though engaging portion 22a of shifter 22 is shifted from engaging portions 51a and 52a of main gears 51 and 52 in engagement therewith, this mechanism can be utilized as an engagement waiting mechanism. In detail, in a case where operating member 23 is operated to move shifter 22 for changing the speed, even when support position P of operating member 23 moves beyond line 1 and shifter 22 makes contact with the side surface of main gear 51 or 52 so that engaging portion 22A does not engage with engaging portion 51a or 52a, the engagement of engaging portion 22a by the rotation of handle shaft 4 or spool 2 can be delayed. Hence, when handle shaft 4 or spool 2 is rotated, operating member 23 in a halt at a position beyond line 1 is automatically rotated by a spring force of coil spring 31 toward the low speed operation position or the high speed operation position, thereby moving shifter 22 to allow engaging portion 22a to engage with engaging portion 51a or 52a.

In addition, in the drawings, reference numeral 26 designates a handle mounted on the utmost end of handle shaft 4.

Figure 2:
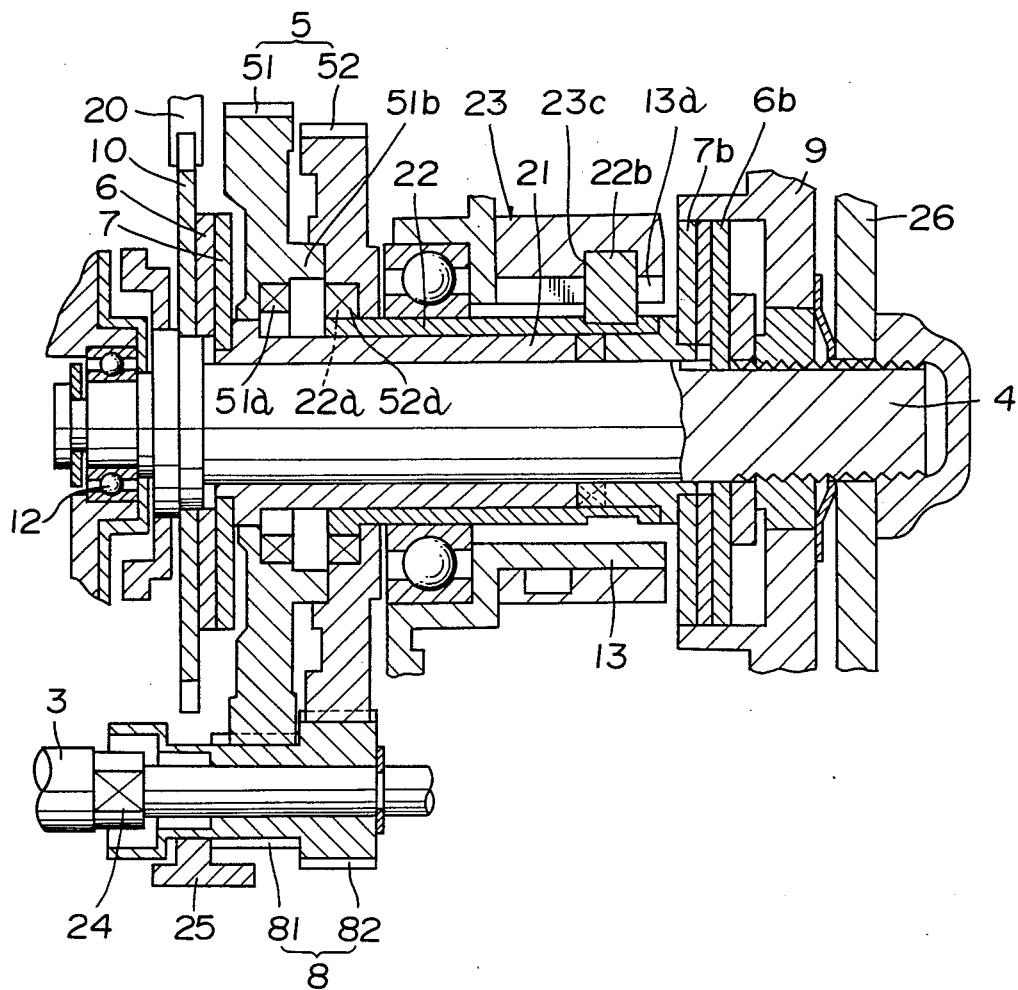
FIG. 2 is an enlarged sectional view of the principal portion thereof.

In the double bearing reel of the invention constructed as described above, when spool 2 is changed-over from the low speed driving mode shown in FIGS. 1 and 2 to the high speed driving mode, operating member 23 is rotated counterclockwise in FIG. 3 so as to be operated to the high speed operation position as shown by the chain line in FIG. 3, whereby shifter 22 moves toward first main gear 51 and engaging portion 22a engages with engaging portion 51a of first main gear 51. Hence, the driving force from handle shaft 4 can be transmitted to spool 2 through the handle shaft side braking member 6b, sleeve side braking member 7b, sleeve 21, shifter 22, first main gear 51, first pinion 81 and spool shaft 3, thereby driving spool 2 at high speed.

When spool 2 is changed-over from the high speed driving mode to the low speed driving mode, operating member 23 at the high speed operation position shown by the chain line in FIG. 3 is rotated clockwise and operated toward the low speed operation position shown by the solid line. Hence, shifter 22 moves towards second main gear 52 and engaging portion 22a engages with engaging portion 52a of second main gear 52. Accordingly, the driving force from handle shaft 4 is transmitted to spool 2 through handle shaft side braking member 6b, sleeve side braking member 7b, sleeve 21, shifter 22, second main gear 52, second pinion 82, and spool shaft 3, thereby driving spool 2 at low speed.

When the fishing line drawn out from spool 2 is subjected to tension in the drawing direction during fishing, the tension is transmitted from spool 2 to sleeve side braking members 7a and 7b through spool shaft 3, first pinion 81 and first main gear 51, or second pinion 82 and second main gear 52, shifter 22, and sleeve 21, whereby a slip is caused between sleeve side braking members 7a and 7b and handle side braking members 6a and 6b. As a result, spool 2, in condition of having a predetermined braking force applied thereto, slidably rotates with respect to handle shaft 4.

In a case where operating member 23 is rotated to effectuate a speed change and engaging portion 22a of shifter 22 does not engage with engaging portion 51a or 52a, but interferes with the side surface thereof so as to cause an operation resistance over the predetermined value, operating member 23 stops at a position where support position P thereof moves beyond line 1. When handle shaft 4 or spool 2 is intended to rotate to engage engaging portion 22a with engaging portion 51a or 52a, coil spring 31 is actuated to automatically rotate operating member 23 in a halt at the above-mentioned position, toward the low speed operation position or the high speed operation position, and also shifter 22 moves toward first main gear 51 or second main gear 52, whereby engaging portion 22a engages with engaging portion 51a or 52a.

In addition, alternatively, handle shaft side braking members 6a and 6b and sleeve side braking members 7a and 7b may be provided only at the utmost end of handle shaft 4.

Alternatively, for example, operating member 23 may be supported to handle shaft 4 to be movable radially thereof, a cam face may be provided between the opposite surfaces of operating member 23 and shifter 22, and a spring for biasing shifter 22 toward the cam face may be provided between shifter 22 and sleeve 21 or side frame 11 stationary with respect to shifter 22, so that operating member 23 may be operated to axially move shifter 22.

As is apparent from the above, in the present invention, the conventional double bearing reel is not changed with respect to its basic construction i.e., its fundamental construction need not be altered to incorporate the invention. According to the invention, a reel is provided which includes (1) a spool and handle shaft which are rotatably supported to the reel body, (2) handle shaft side braking members, sleeve side braking members for applying the braking force to the rotation of the spool, and a main gear, all of which are provided around the handle shaft, and (3) a pinion which is provided at the spool shaft. The reel according to the invention is further provided with two main gears, two pinions, a sleeve, and a shifter, thereby providing structure for changing the driving speed for the spool with only a relatively small modification of the basic construction of the reel. Accordingly, the invention provides a double bearing reel which is simple in construction and inexpensive to produce while the spool can be driven by changing the rotation speed thereof.

While an embodiment of the invention has been shown and described in the above specification and attached drawings, the invention is not limited to the specific construction set forth herein. The illustrated embodiment is merely exemplary of the invention and the scope of the attached claims is not limited or defined thereby.

I claim:

1. A double bearing reel, comprising:
   a reel body;

a spool shaft rotatably supported to said reel body and carrying a spool;

a handle shaft for driving said spool shaft;

a first main gear and a second main gear supported to rotate about said handle shaft; said first and second main gears having different diameters;

a sleeve rotatably supported to said handle shaft and including a shifter for selectively transmitting rotation of said handle shaft alternatively to one of said first and second main gears;

a drag mechanism including handle shaft side braking members rotatable together with said handle shaft and sleeve side braking members rotatable together with said sleeve, said sleeve side braking members being disposed axially opposite to said handle shaft side braking members relative to an axial direction of said handle shaft;

operating means for operating said shifter to select between transmitting rotation of the handle shaft to one of said first and second main gears and including an operating member positioned outside of said reel body, and a pinion means supported to said spool shaft to transmit to said spool shaft a driving force transmitted to said main gears and in turn to said pinion means, said pinion means comprising a first pinion engageable with said first main gear and a second pinion engageable with said second main gear, and wherein said operating member includes an operating portion extending outwardly from said reel body, and said reel further comprises an unstable change-over mechanism provided between said operating portion and said reel body supporting said operating member, said unstable change-over mechanism comprising means for biasing said operating member alternately toward a low speed operation position or a high speed operation position and holding said operating member thereto.

2. A double bearing reel according to claim 1, wherein said shifter is provided with a projecting portion projecting outside of said reel body, said projecting portion is provided with a fitting-in projection, said reel body is provided with a support cylinder projecting from one side of said reel body concentrically with said handle shaft, and said support cylinder rotatably supports a boss of said operating member, said boss having a spiral groove engageable with said fitting-in projection.

3. A double bearing reel according to claim 1, wherein said unstable change-over holding mechanism comprises a first spring holder swingably supported relative to said reel body, a second spring holder swingably supported relative to said operating portion of said operating member, and a coil spring supported between said first and second spring holders, said first spring holder having its pivot position relative to said reel body offset in position from a center support position of said operating member on said reel body.

4. A double bearing reel, comprising:
a reel body;
a spool shaft rotatably supported to said reel body and carrying a spool;
a handle shaft for driving said spool shaft;
a first main gear and a second main gear supported to rotate about said handle shaft; said front and second main gears having different diameters;
a sleeve rotatably supported to said handle shaft and including a shifter for selectively transmitting rotation of said handle shaft alternatively to one of said first and second main gears;

a drag mechanism including handle shaft side braking members rotatable together with said handle shaft and sleeve side braking members rotatable together with said sleeve, said sleeve side braking members being disposed axially opposite to said handle shaft side braking members relative to an axial direction of said handle shaft;

operating means for operating said shifter to select between transmitting rotation of the handle shaft to one of said first and second main gears and including an operating member positioned outside of said reel body, and a pinion means supported to said spool shaft to transmit to said spool shaft a driving force transmitted to said main gears and in turn to said pinion means, said pinion means comprising a first pinion engageable with said first main gear and a second pinion engageable with said second main gear, wherein said shifter is provided with a projecting portion projecting outside of said reel body, said projecting portion is provided with a fitting-in projection, said reel body is provided with a support cylinder projecting from one side of said reel body concentrically with said handle shaft, and said support cylinder rotatably supports a boss of said operating member, said boss having a spiral groove engageable with said fitting-in projection, wherein said operating member includes an operating portion extending outwardly from said boss, and said reel further comprises an unstable change-over mechanism provided between said operating portion and said reel body supporting said operating member, said unstable change-over mechanism comprising means for biasing said operating member alternately toward a low speed operation position or a high speed operation position and holding said operating member thereto, and wherein said unstable change-over holding mechanism comprises a first spring holder swingably supported relative to said reel body, a second spring holder swingably supported relative to said operating portion of said operating member, and a coil spring supported between said first and second spring holders, said first spring holder having its pivot position from a center support position of said operating member on said reel body.

5. A double bearing reel comprising:
a reel body;
a spool shaft rotatably supported to said reel body and carrying a spool;
a handle shaft for driving said spool shaft;
a first main gear and a second main gear supported to rotate about said handle shaft; said first and second main gears having different diameters;
a sleeve rotatably supported to said handle shaft and including a shifter for selectively transmitting rotation of said handle shaft alternatively to one of said first and second main gears;
a drag mechanism including handle shaft side braking members rotatable together with said handle shaft and sleeve side braking members rotatable together with said sleeve, said sleeve side braking members being disposed axially opposite to said handle shaft side braking members relative to an axial direction of said handle shaft;

operating means for operating said shifter to select between transmitting rotation of the handle shaft to one of said first and second main gears and including an operating member positioned outside of said reel body, and a pinion means supported to said spool shaft to transmit to said spool shaft a driving force transmitted to said main gears and in turn to said pinion means, said pinion means comprising a first pinion engageable with said first main gear and a second pinion engageable with said second main gear, and wherein said sleeve extends along said handle shaft and includes a projection which projects outwardly from said reel body, at said projection is supported said sleeve side braking member disposed opposite to said handle shaft side braking member supported to said handle shaft, and an adjustor is screwably mounted to said handle shaft so as to be axially movable to adjust a dragging braking force of said drag mechanism comprising said sleeve side and handle shaft side braking members.

6. A double bearing wheel reel according to claim 5, wherein an anti-reverse-rotation gear is rotatably supported at a root portion of said handle shaft, said reel body includes an anti-reverse-rotation pawl engageable with said anti-reverse-rotation gear, said sleeve side braking member is supported at an utmost end of said sleeve, and said handle shaft side braking member in press-contact with said anti-reverse-rotation gear is supported to said root portion of said handle shaft.

* * * * *